United States Patent
Salman (10) Patent No.: US 12,438,361 B2
(45) Date of Patent: Oct. 7, 2025

(54) LOW-LEAKAGE ELECTROSTATIC DISCHARGE CLAMP CIRCUIT

(71) Applicant: Apple Inc., Cupertino, CA (US)

(72) Inventor: Akram A Salman, Cedar Park, TX (US)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 18/473,161

(22) Filed: Sep. 22, 2023

(65) Prior Publication Data

US 2025/0105622 A1    Mar. 27, 2025

(51) Int. Cl.
*H02H 9/04* (2006.01)

(52) U.S. Cl.
CPC .................................. *H02H 9/045* (2013.01)

(58) Field of Classification Search
CPC .......................................................... H02H 9/045
USPC ..................................................... 361/56, 111
See application file for complete search history.

(56) References Cited

U.S. PATENT DOCUMENTS

| | | | |
|---|---|---|---|
| 7,236,339 B2 | 6/2007 | Miller et al. | |
| 7,978,454 B1 | 7/2011 | Pasqualini | |
| 9,263,433 B2 | 2/2016 | Sofer et al. | |
| 9,698,789 B2 | 7/2017 | Hsiao et al. | |
| 10,826,291 B2 | 11/2020 | Xavier | |
| 11,063,429 B2 | 7/2021 | Sithanandam et al. | |
| 11,594,878 B2 | 2/2023 | Ille et al. | |
| 2009/0168282 A1* | 7/2009 | Wu | H02H 9/046 361/56 |
| 2013/0027820 A1* | 1/2013 | Padilla | H02H 9/046 361/56 |
| 2014/0092506 A1* | 4/2014 | Ahsan | H10D 89/813 257/E27.081 |
| 2018/0351352 A1* | 12/2018 | Chen | H10D 89/819 |
| 2020/0251466 A1* | 8/2020 | Stockinger | H10D 89/819 |
| 2021/0305809 A1 | 9/2021 | Hung et al. | |
| 2022/0239095 A1 | 7/2022 | Lee et al. | |
| 2023/0148160 A1 | 5/2023 | Sivakumar et al. | |

FOREIGN PATENT DOCUMENTS

| CN | 112186726 A | 3/2021 |
|---|---|---|
| TW | I374595 B | * 10/2012 |

OTHER PUBLICATIONS

Machine translation of Ker et al. Taiwanese Patent Document TW I374595 B Oct. 2012 (Year: 2012).*

* cited by examiner

*Primary Examiner* — Kevin J Comber
(74) *Attorney, Agent, or Firm* — Fletcher Yoder, P.C.

(57) ABSTRACT

This disclosure is directed to an electrostatic discharge clamp circuit with reduced leakage including a switching circuit and a trigger circuit. The switching circuit may include a first switch and a second switch. A drain and a gate of the first switch may be couple to a power supply rail. The first switch may close in response to a voltage spike. Moreover, a drain of the second switch may be coupled to a source of the first switch and a source of the second switch may be coupled to a ground terminal. The trigger circuit may be coupled to a gate of the second switch and may also couple to the power supply rail and the ground terminal. The trigger circuit may close the second switch in response to the voltage spike.

20 Claims, 6 Drawing Sheets

LOW-LEAKAGE ELECTROSTATIC DISCHARGE CLAMP CIRCUIT

BACKGROUND

This application relates to an electrostatic discharge (ESD) clamp circuit to protect other circuitry of an electronic device by discharging undesirable electrical charge with reduced electrical leakage.

An electronic device may include various circuit components and an electrostatic discharge (ESD) clamp circuit. The electronic device may receive an input voltage for performing operations. The circuit components of the electronic device may each have a respective voltage rating (e.g., a voltage range) for receiving input signals. For example, the electronic device may generate and/or provide the input signals to each of the circuit components based on the respective voltage ratings and the input voltage.

In some cases, the electronic device may receive voltage spikes having excessive electrical charges. For example, the electronic device may receive the voltage spikes based on a sudden flow of electrical charge (e.g., static charge) from other objects (e.g., a human, another electrical circuit) with different electrical potentials. If not compensated for, the voltage spikes and/or the excessive electrical charges may degrade and/or adversely affect one or more of the circuit components.

The ESD clamp circuit may be used to divert the excessive electrical charges away from the internal circuitry. In particular, the ESD clamp circuit may conduct at least a portion of electrical currents associated with the voltage spikes to a ground terminal to divert the excessive electrical charges. As such, the ESD clamp circuit may protect the circuit components of the electronic device from high voltages, such as the voltage spikes, and/or the excessive electrical charges.

With the foregoing in mind, in some cases, the ESD clamp circuit may leak electrical current to the ground terminal under normal operation. For example, the ESD clamp circuit may continually conduct a portion of the electrical current of the input voltage to the ground terminal when no voltage spike is present. The electrical current leakage of the ESD clamp circuit may reduce a stored power of the electronic device (e.g., a battery storage), reduce an efficiency of the circuit components, reduce an efficiency of the electronic device, or impair operations of one or more of the circuit components, among other things. That is, the electrical current leakage of the ESD clamp circuit may be undesired.

SUMMARY

An electrostatic discharge (ESD) clamp circuit may include a trigger circuit and a switching circuit having circuitry that reduces the voltage difference between the terminals of the switch, thereby reducing the leakage current of the ESD clamp. An electronic device may include various circuit components and one or more of these ESD clamp circuits. The electronic device may include a power supply rail (e.g., a positive power supply rail) and a ground terminal (e.g., a negative power supply rail). The power supply rail may receive a bias voltage based on a voltage rating of the electronic device during an operation of the electronic device. Moreover, the power supply rail may receive a ground voltage when the electronic device is idle and/or off. The ground terminal may receive the ground voltage. In different cases, the ground voltage may include a voltage value lower than a voltage value of the bias voltage (e.g., 0 volt, near 0 volt). The ESD clamp circuit may be coupled to the power supply rail and the ground terminal.

The power supply rail may receive voltage spikes including a sudden flow of electrical charges from other objects with different electrical potentials. For example, the voltage spikes may be characterized by a voltage change rate on the power supply rail higher than a voltage change rate (e.g., a voltage change threshold over a time period). Moreover, the power supply rail may receive the voltage spikes during an operation of the electronic device and/or when the electronic device is idle and/or off. If not compensated for, the voltage spikes may degrade and/or adversely affect the circuit components of the electronic device. As such, the ESD clamp circuit may conduct at least a portion of electrical currents of a voltage spike from the power supply rail to the ground terminal to reduce adverse effects of the voltage spike.

In particular, the ESD clamp circuit may include a trigger circuit and a switching circuit to conduct the electrical currents of a voltage spike from the power supply rail to the ground terminal in response to sensing the voltage spike. The switching circuit may be coupled to the power supply rail and the ground terminal. The trigger circuit may be coupled to the power supply rail, the ground terminal, and the switching circuit. In some embodiments, the switching circuit may include one or more switches (e.g., transistors).

The trigger circuit may close the switching circuit in response to sensing a voltage spike. The switching circuit may close to provide a conductive path between the power supply rail and the ground terminal. The conductive path may conduct the electrical currents of the voltage spike from the power supply rail to the ground terminal to reduce adverse effects of the voltage spikes on the circuit components. Accordingly, the ESD clamp circuit may reduce a voltage value of the voltage spikes and/or divert an amount of the electrical charges of the voltage spikes on the power supply rail in response to sensing the voltage spikes. The trigger circuit may open the switching circuit when no voltage spike is present on the power supply rail.

If not compensated for, the switching circuit may leak electrical current to the ground terminal. For example, the switching circuit (e.g., the one or more transistors) may conduct a portion of electrical currents of the bias voltage to the ground terminal when no voltage spikes are present on the power supply rail. In some cases, a voltage difference between terminals of a switch (e.g., a transistor) of the switching circuit may correspond to an amount of a leakage current. As such, the switching circuit may include additional circuitry to reduce the voltage difference between the terminals of the switch. Accordingly, the additional circuitry may reduce the leakage current of the switch when no voltage spike is present on the power supply rail.

In some embodiments, the switch may include an N-type metal oxide semiconductor (NMOS) switch. In such embodiments, the additional circuitry may reduce a voltage difference between a gate and a drain of the switch to reduce the leakage current. For example, the additional circuitry may include one or more additional switches coupled to the drain of the NMOS switch. In alternative or additional embodiments, the switch may include a P-type metal oxide semiconductor (PMOS) switch. In such embodiments, the additional circuitry may reduce a voltage difference between a gate and a source of the PMOS switch to reduce the leakage current. For example, the additional circuitry may include one or more additional switches coupled to the source of the PMOS switch.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
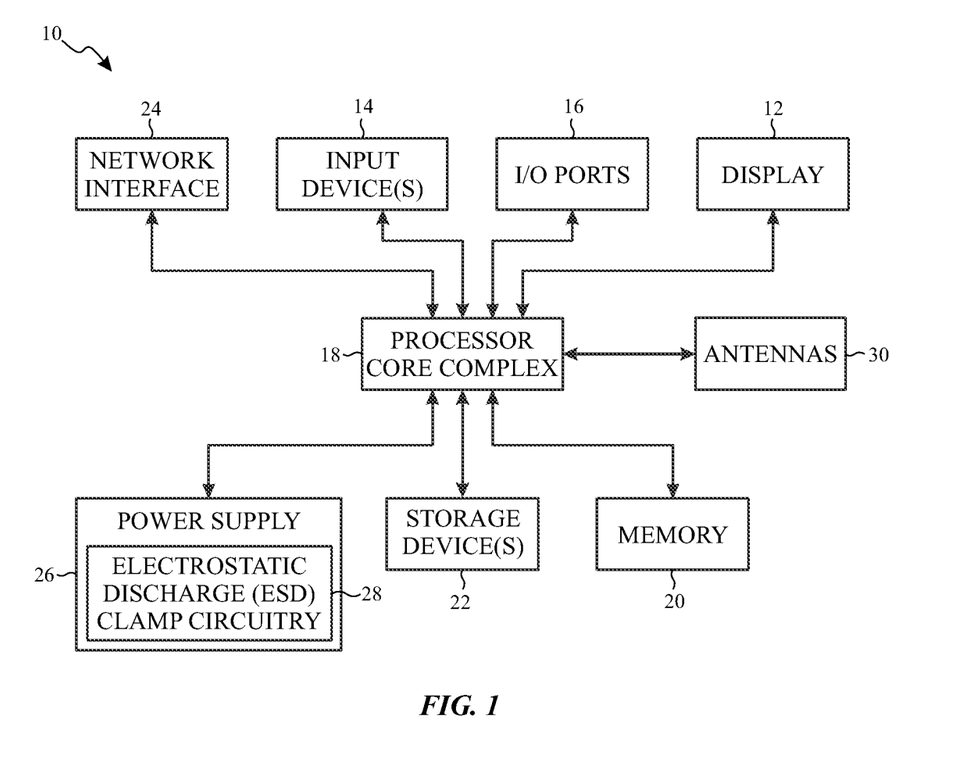
FIG. 1 is a block diagram of an electronic device with an electronic display, according to embodiments of the present disclosure.

An electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, a power source 26 (e.g., power supply) including electrostatic discharge (ESD) clamp circuitry 28, and one or more antennas 30. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 and/or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to one or more components in the electronic device 10, such as the processor core complex 18 or the electronic display 12. For example, the power source 26 may include a power supply rail and/or a ground terminal coupled to the one or more components in the electronic device 10, such as the processor core complex 18 or the electronic display 12, to provide the electrical power. Thus, the power source 26 may include any suitable source of energy, such as a rechargeable lithium polymer (Li-poly) battery or an alternating current (AC) power converter.

Moreover, the power source 26 may include the ESD clamp circuitry 28. In some embodiments, the ESD clamp circuitry 28 may include one or multiple ESD clamp circuits sensing voltage spikes on the power supply rail and/or the ground terminal. Moreover, the ESD clamp circuitry 28 may ground at least a portion of electrical charges and/or electrical currents of the voltage spike. For example, the power source 26 including the ESD clamp circuitry 28 may reduce one or more adverse effects of voltage spikes on the processor core complex 18 and/or the electronic display 12 coupled to the power source 26, as will be appreciated.

The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components in the electronic display 12. The touch sensing components may receive user inputs by detecting occurrence or position of an object touching the surface of the electronic display 12.

The electronic display 12 may include driver circuitry (e.g., display driver circuitry) and/or a display panel. The display panel 32 may include pixel circuitry with an array of display pixels. Moreover, the driver circuitry may include various circuitry to provide one or more stable positive and/or negative supply voltages, such the power supply rail and/or the ground terminal. Image data for display on the electronic display 12 may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on image data generated by the processor core complex 18, or the electronic display 12 may display frames based on image data received via the network interface 24, an input device, or an I/O port 16.

Figure 2:
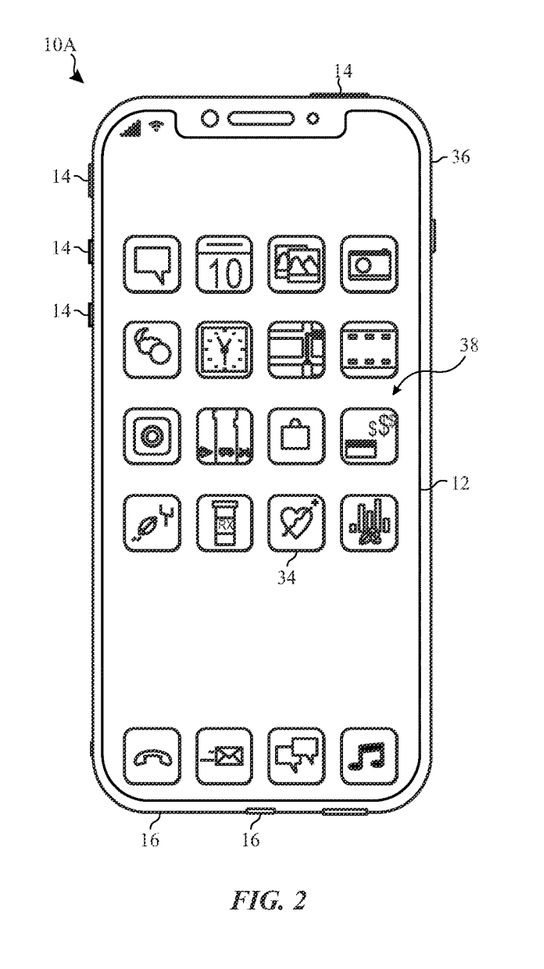
FIG. 2 is a front view of a handheld device representing an example of the electronic device of FIG. 1, according to embodiments of the present disclosure.

The electronic device 10 may also have the one or more antennas 30 electrically coupled to the processor core complex 18. The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 36 (e.g., housing). The enclosure 36 may protect interior components from physical damage or shield them from electromagnetic interference, such as by surrounding the electronic display 12. The electronic display 12 may display a graphical user interface (GUI) 38 having an array of icons. When an icon 34 is selected either by an input device 14 or a touch-sensing component of the electronic display 12, an application program may launch.

The input devices 14 may be accessed through openings in the enclosure 36. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
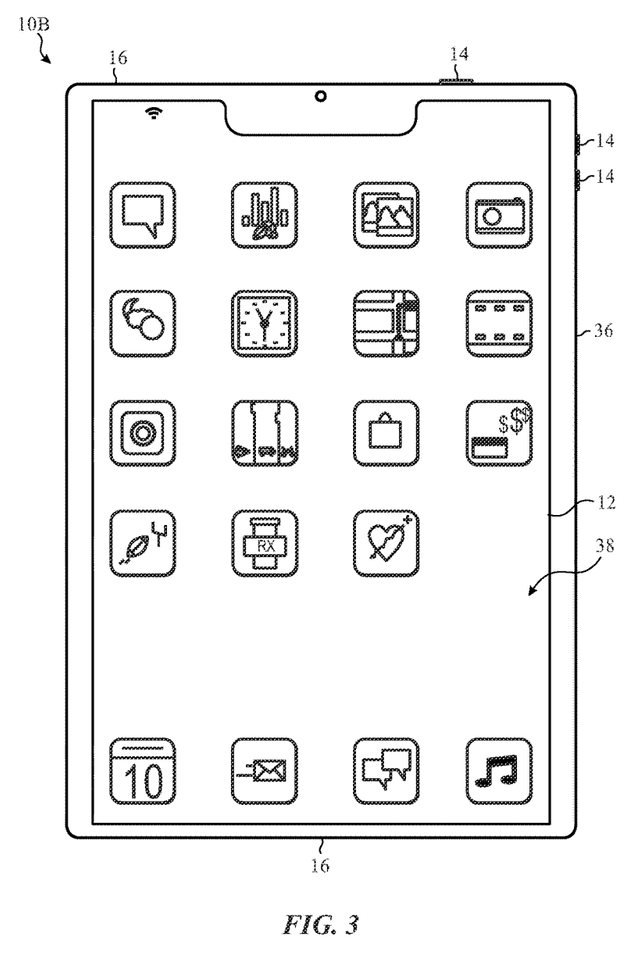
FIG. 3 is a front view of another handheld device representing another example of the electronic device of FIG. 1, according to embodiments of the present disclosure.
Figure 4:
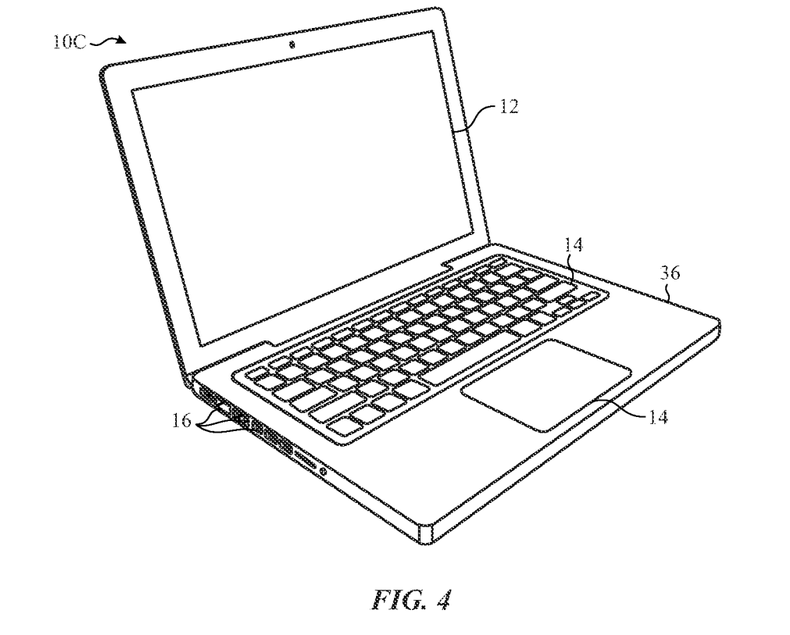
FIG. 4 is a perspective view of a notebook computer representing an example of the electronic device of FIG. 1, according to embodiments of the present disclosure.
Figure 5:
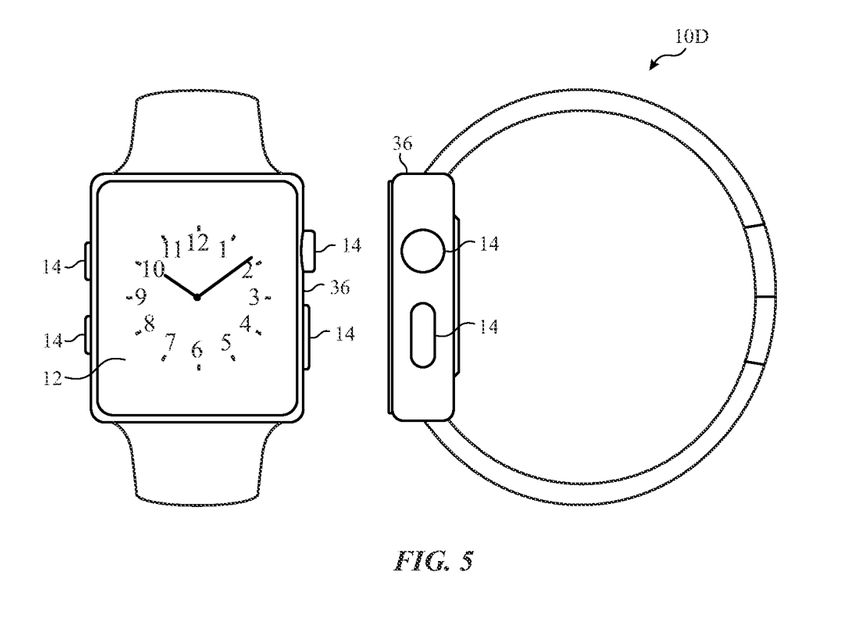
FIG. 5 illustrates front and side views of a wearable electronic device representing another example of the electronic device of FIG. 1, according to embodiments of the present disclosure.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MAC-BOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc.

As depicted, the tablet device 10B, the computer 10C, and the watch 10D each also includes an electronic display 12, input devices 14, I/O ports 16, and an enclosure 36. The electronic display 12 may display a GUI 38. Here, the GUI 38 shows a visualization of a clock. When the visualization is selected either by the input device 14 or a touch-sensing component of the electronic display 12, an application program may launch, such as to transition the GUI 38 to presenting the icons 34 discussed with respect to FIGS. 2 and 3.

FIGS. 6-11 are schematic diagrams of different ESD clamp circuits, according to embodiments of the present disclosure. In some embodiments, the electronic device 10 discussed above may include one or multiple of each of the ESD clamp circuits of FIGS. 6-11. The ESD clamp circuitry 28 of the power supply 26 may include any viable combination of the ESD clamp circuits discussed herein with respect to FIGS. 6-11. In the depicted embodiments, the power supply 26 may include a power supply rail 50 and a ground terminal 52. For example, the ESD clamp circuitry 28 may include multiple ESD clamp circuits coupled (e.g., coupled in parallel) to the power supply rail 50 and the ground terminal 52.

The power supply rail 50 may receive a direct current (DC) signal (e.g., a bias voltage), for example, during an operation of the electronic device 10. In some cases, the DC signal may include signals with a frequency below a threshold (e.g., below 10 hertz (Hz), below 15 Hz, below 100 Hz, and so on). Moreover, the power supply rail 50 may receive a ground voltage, for example, when the electronic device 10 is idle and/or off. The ground terminal 52 may receive the ground voltage. In some cases, the ground voltage may have a voltage value lower than a voltage value of the DC signal such as 0 volts, near 0 volts, a positive voltage below a voltage value of the DC signal, or a negative voltage below the voltage value of the DC signal.

Figure 6:
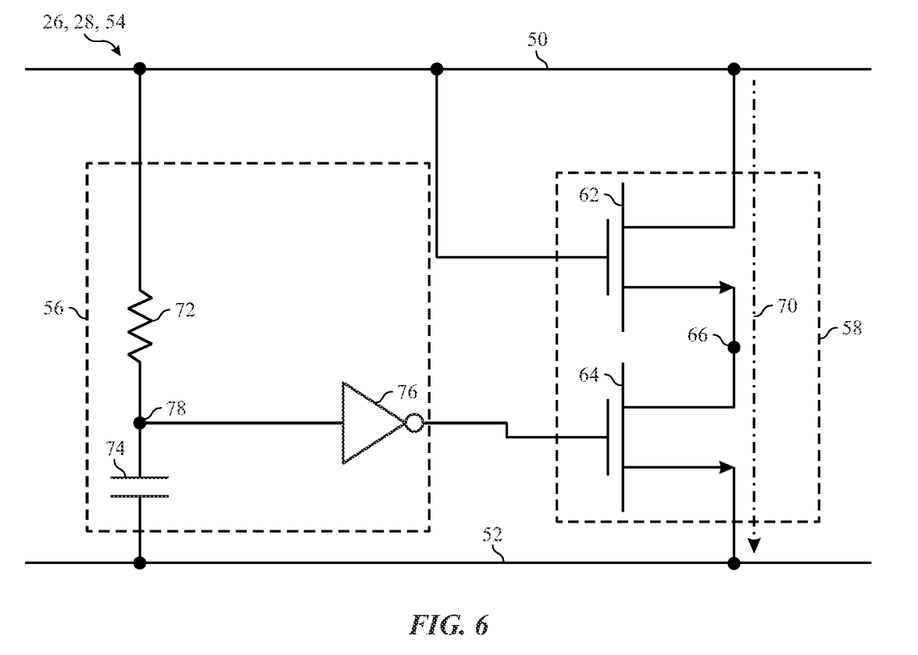
FIG. 6 is a block diagram of a first electrostatic discharge (ESD) clamp circuit including N-type switches, according to embodiments of the present disclosure.

FIG. 6 is a schematic diagram of a first ESD clamp circuit 54, according to embodiments of the present disclosure. The first ESD clamp circuit 54 may include a first trigger circuit 56 and a first switching circuit 58. In the depicted embodiment, the first switching circuit 58 may include a first N-type switch 62 (e.g., a first switch) coupled to a second N-type switch 64 (e.g., a second switch) at a first node 66.

In the depicted embodiment, a drain and a gate of the first N-type switch 62 may be coupled to the power supply rail 50. A drain of the second N-type switch 64 may be coupled to a source of the first N-type switch 62 at the first node 66.

A source of the second N-type switch 64 may be coupled to the ground terminal 52. In some cases, the first switching circuit 58 may provide a conductive path 70 between the power supply rail 50 and the ground terminal 52. In particular, the first N-type switch 62 and the second N-type switch 64 may at least partially close to provide the conductive path 70, as will be appreciated. Moreover, the first N-type switch 62, the second N-type switch 64, or both may open to remove the conductive path 70.

In alternative or additional embodiments, the first switching circuit 58 may include additional N-type switches (e.g., a third switch, a fourth switch, and so on) to provide the conductive path 70. For example, the additional N-type switches may be coupled between the first N-type switch 62 and the second N-type switch 64. In some cases, a gate and a drain of such additional switches may couple to another switch being directly or indirectly coupled to the power supply rail 50. Moreover, a source of such additional switches may couple to another switch being directly or indirectly coupled to the ground terminal 52. It should also be appreciated that the first N-type switch 62 and the second N-type switch 64 may each include any viable electrical switching component such as Negative, Positive, Negative (NPN) transistors and/or N-type metal-oxide-semiconductor field-effect transistors (MOSFETs).

The first trigger circuit 56 may include a first resistor 72, a first capacitor 74, and an inverter 76. In the depicted embodiment, the first resistor 72 may be coupled to the power supply rail 50. The first capacitor 74 may be coupled to the ground terminal 52 and may be coupled to the first resistor 72 at a second node 78. An input of the inverter 76 may be coupled to the first resistor 72 and the first capacitor 74 at the second node 78. Moreover, an output of the inverter 76 may be coupled to a gate of the second N-type switch 64 of the first switching circuit 58.

In some cases, the power supply rail 50 may receive the ground voltage. In the depicted embodiment, the gate and the drain of the first N-type switch 62 may receive the ground voltage. As such, the first N-type switch 62 may open (e.g., remain open, become open). Accordingly, the first switching circuit 58 may open and/or remove the conductive path 70 between the power supply rail 50 and the ground terminal 52 in response to the ground voltage.

In alternative or additional cases, the power supply rail 50 may receive the DC signal. In the depicted embodiment, the gate and the drain of the first N-type switch 62 may receive the DC signal. As such, the first N-type switch 62 may close and conduct the DC signal (e.g., at least a portion of the DC signal). Moreover, the first resistor 72 of the first trigger circuit 56 may receive the DC signal via the power supply rail 50. The first capacitor 74 and the inverter 76 may receive the DC signal (e.g., at least a portion of the DC signal) via the second node 78.

A current flow through the first capacitor 74 may be proportional to a rate of voltage change across the first capacitor 74 over a time period (e.g., 1 nanosecond (ns), 10 ns, 30 ns, 500 ns, and so on). The DC signal may have a constant voltage, near constant voltage, and/or a voltage change rate (e.g., frequency) below a capacitor voltage change threshold of the first capacitor 74 over the time period. As such, the first capacitor 74 may provide an open connection (e.g., nearly open, relatively open) in response to the DC signal. Accordingly, a voltage value of the second node 78 may become equal to, nearly equal to, and/or correspond to a voltage value of the DC signal on the power supply rail 50.

The voltage value of the DC signal on the power supply rail 50 may correspond to a high logic value of the inverter 76. For example, the DC signal may have a voltage value higher than a high logic value threshold of the inverter 76. As such, the inverter 76 may receive an input signal (e.g., the DC signal, a portion of the DC signal) having a high logic value via the second node 78. The inverter 76 may generate an output signal having a low logic value in response to receiving the input signal.

The inverter 76 may provide the output signal having the low logic value to the gate of the second N-type switch 64. As such, the second N-type switch 64 may open (e.g., remain open, become open). Moreover, the first switching circuit 58 may open and/or remove the conductive path 70 between the power supply rail 50 and the ground terminal 52 in response to opening the second N-type switch 64. Accordingly, the first ESD clamp circuit 54 may remove the conductive path 70 when the power supply rail 50 of the electronic device 10 receives the ground voltage and/or the DC signal.

The first N-type switch 62 may reduce a voltage difference between the drain and the gate of the second N-type switch 64 when receiving the DC signal. For example, if not compensated for, the second N-type switch 64 may conduct a portion of the electrical currents of the DC signal to the ground terminal 52 when no voltage spikes are present on the power supply rail 50. As such, in some cases, the first N-type switch 62 may reduce a leakage current of the second N-type switch 64 when the power supply rail 50 is receiving the DC signal. Accordingly, the first ESD clamp circuit 54 may reduce the leakage current of the first switching circuit 58 when no voltage spike is present on the power supply rail 50.

With the foregoing in mind, the first ESD clamp circuit 54 may provide the conductive path 70 when the power supply rail 50 and/or the ground terminal 52 of the electronic device 10 receives a voltage spike, as will be appreciated. The voltage spike may be in relation to a voltage of the DC signal and/or ground voltage. The voltage spike may include sudden flow of electrical charges from other objects with different electrical potentials to the power supply rail 50 and/or the electronic device 10. For example, the voltage spike may include electrostatic discharge from a human body and/or another object (e.g., another electronic device) to the electronic device 10.

The voltage spike may have a voltage value above (e.g., or rising above) a threshold. In some cases, the voltage spike may be characterized by a voltage change rate (e.g., a voltage rise and/or fall over a time period) higher than a voltage change rate threshold. For example, the voltage change rate threshold may correspond to 1 volt (V) per 1 nanosecond (ns), 100 V per 1 ns, 1 V per 10 ns, or 5 V per 20 ns, among other possibilities. It should be appreciated that the first ESD clamp circuit 54 may receive the voltage spike when receiving the DC signal and/or the ground voltage.

In the depicted embodiment, the gate and the drain of the first N-type switch 62 may receive the voltage spike (e.g., one or more voltage spikes). The first N-type switch 62 may partially and/or fully close (e.g., turn on) in response to the voltage spike. Moreover, the first trigger circuit 56 may receive the voltage spike. As mentioned above, the current flow through the first capacitor 74 may be proportional to a rate of voltage change across the first capacitor 74. Moreover, the voltage spike may be characterized by a voltage change rate higher than the voltage change rate threshold.

The voltage change rate of the voltage spike may correspond to a high rate of voltage change across the first capacitor 74 associated with conducting the current flow through the first capacitor 74. Accordingly, the first capacitor 74 may provide a closed connection (e.g., nearly closed, relatively closed) in response to the voltage spike. Moreover, a voltage value of the second node 78 may become equal to or nearly equal to a voltage value of the ground terminal 52 based on the closed connection of the first capacitor 74.

A voltage value of the ground terminal 52 may correspond to a low logic value of the inverter 76. As such, the inverter 76 may receive an input signal (e.g., the ground voltage) having a low logic value in response to the voltage spike via the second node 78. The inverter 76 may generate an output signal with a high logic value in response to receiving the input signal having the low logic value. The inverter 76 may provide the output signal with the high logic value to the gate of the second N-type switch 64.

The second N-type switch 64 may partially and/or fully close (e.g., turn on) based on the gate of the second N-type switch 64 receiving the output signal with the high logic value. Moreover, as mentioned above, the first N-type switch 62 may partially and/or fully close (e.g., turn on) in response to the voltage spike. As such, the first switching circuit 58 may close and/or provide the conductive path 70 between the power supply rail 50 and the ground terminal 52 in response to the voltage spike.

The first N-type switch 62 and the second N-type switch 64 may conduct at least a portion of the electrical currents of the voltage spike to the ground terminal 52 via the conductive path 70. Accordingly, the first ESD clamp circuit 54 may ground at least a portion of the electrical currents of the voltage spike to reduce one or more adverse effects of the voltage spike. For example, if not compensated for, the voltage spike may have adverse effects on electrical components, stored data, transient data, and/or may cause overheating and/or instability of the electronic device 10.

Subsequently, the first trigger circuit 56 may remove the high logic value from the gate of the second N-type switch 64. For example, a resistance value of the first resistor 72 and a capacitance value of the first capacitor 74 may provide a resistor-capacitor (RC) time constant for charging and/or discharging the first capacitor 74 through the first resistor 72. The RC time constant may correspond to a time for opening and/or removing the conductive path 70 after closing the first N-type switch 62 and the second N-type switch 64.

The RC time constant may correspond to a time (e.g., less than 1 ns, less than 10 ns, less than 100 ns, less than 150 ns, and so on) for electrostatic discharge from a human body and/or another object (e.g., another electronic device) to the ground terminal 52 via the conductive path 70. In some cases, the resistance value of the first resistor 72 and/or the capacitance value of the first capacitor 74 may be adjusted to reduce interference with the operation of the electronic device 10. For example, the first trigger circuit 56 may open and/or remove the conductive path 70 before grounding a portion of (e.g., reducing a voltage of) the DC signal higher than a threshold.

Figure 7:
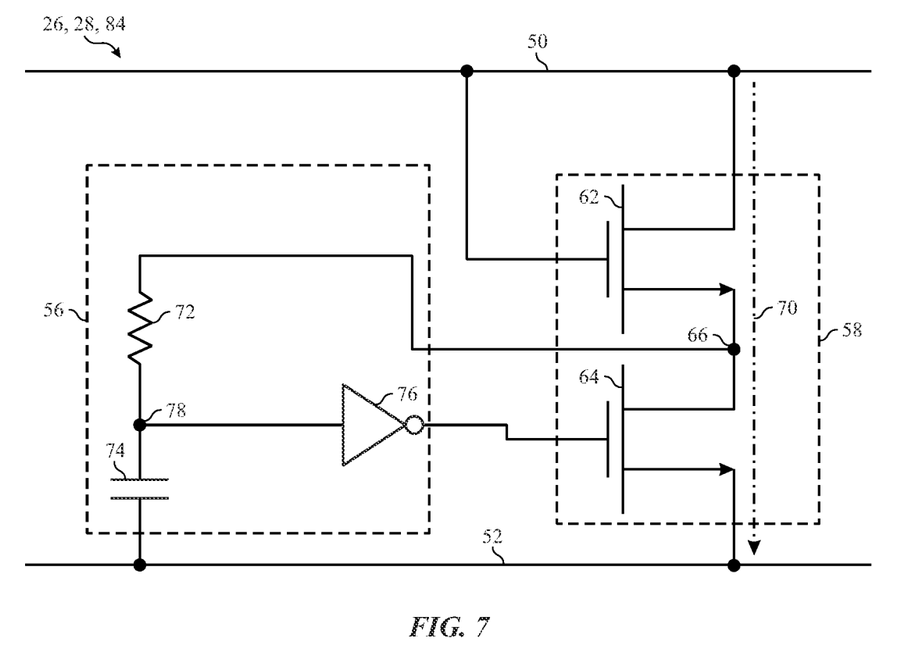
FIG. 7 is a schematic diagram of a second ESD clamp circuit 84 with a first trigger circuit being coupled to a first switching circuit, according to embodiments of the present disclosure.

FIG. 7 is a schematic diagram of a second ESD clamp circuit 84 with the first trigger circuit 56 being coupled to the first switching circuit 58 at the first node 66, according to embodiments of the present disclosure. The second ESD clamp circuit 84 may include the first trigger circuit 56 including the first resistor 72, the first capacitor 74, and the inverter 76, and the first switching circuit 58 including the first N-type switch 62 coupled to the second N-type switch 64 at the first node 66.

In the depicted embodiment, a drain and a gate of the first N-type switch 62 may be coupled to the power supply rail 50. A drain of the second N-type switch 64 may be coupled to a source of the first N-type switch 62 at the first node 66. Moreover, the first trigger circuit 56 may be coupled to the source of the first N-type switch 62 and the drain of the second N-type switch 64 via the first node 66. In particular, the first resistor 72 may be coupled to the source of the first N-type switch 62 and the drain of the second N-type switch 64 at the first node 66 in lieu of being coupled to the power supply rail 50. A source of the second N-type switch 64 may be coupled to the ground terminal 52. The first N-type switch 62 and the second N-type switch 64 may close (e.g., at least partially close) to provide the conductive path 70. Moreover, the first N-type switch 62, the second N-type switch 64, or both may open to remove the conductive path 70.

In some cases, the power supply rail 50 may receive the ground voltage. In the depicted embodiment, the gate and the drain of the first N-type switch 62 may receive the ground voltage. The first N-type switch 62 may open (e.g., remain open, become open) to remove a gate voltage of the first N-type switch 62 in response to the ground voltage. Accordingly, the first switching circuit 58 may open and/or remove the conductive path 70 between the power supply rail 50 and the ground terminal 52 in response to the ground voltage.

In alternative or additional cases, the power supply rail 50 may receive the DC signal. In the depicted embodiment, the gate and the drain of the first N-type switch 62 may receive the DC signal. As such, the first N-type switch 62 may at least partially close (e.g., remain close, become close) and conduct the DC signal (e.g., at least a portion of the DC signal). Moreover, the first resistor 72 of the first trigger circuit 56 may receive the DC signal via the first node 66.

The first capacitor 74 and the inverter 76 may receive the DC signal (e.g., the at least a portion of the DC signal) via the second node 78. As discussed above, the current flow through the first capacitor 74 may be proportional to a rate of voltage change across the first capacitor 74 over a time period (e.g., 1 nanosecond (ns), 10 ns, 30 ns, 500 ns, and so on). As such, the first capacitor 74 may provide an open connection (e.g., nearly open, relatively open) in response to the DC signal. Accordingly, a voltage value of the second node 78 may become equal to, nearly equal to, and/or correspond to a voltage value of the DC signal on the power supply rail 50.

As mentioned above, the voltage value of the DC signal on the power supply rail 50 may correspond to a high logic value of the inverter 76. As such, the inverter 76 may receive an input signal (e.g., the DC signal, a portion of the DC signal) having a high logic value via the second node 78. The inverter 76 may generate an output signal having a low logic value in response to receiving the input signal. The inverter 76 may provide the output signal having the low logic value to the gate of the second N-type switch 64.

The second N-type switch 64 may open (e.g., remain open, become open) based on the gate of the second N-type switch 64 receiving the output signal with the low logic value. As such, the first switching circuit 58 may open and/or remove the conductive path 70 between the power supply rail 50 and the ground terminal 52 in response to opening the second N-type switch 64. Accordingly, the second ESD clamp circuit 84 may remove the conductive path 70 when the power supply rail 50 of the electronic device 10 receives the ground voltage and/or the DC signal.

The second ESD clamp circuit 84 may close and/or provide the conductive path 70 when the power supply rail 50 and/or the ground terminal 52 of the electronic device 10 receive a voltage spike. It should be appreciated that the second ESD clamp circuit 84 may receive the voltage spike when receiving the DC signal and/or the ground voltage. In the depicted embodiment, the first N-type switch 62 may partially and/or fully close (e.g., turn on) based on the gate and the drain of the first N-type switch 62 receiving the voltage spike.

Moreover, the first trigger circuit 56 may receive at least a portion of the voltage spike via the first node 66. As discussed above, the first capacitor 74 may provide a closed connection (e.g., nearly closed, relatively closed) in response to the voltage spike. Moreover, the voltage value of the second node 78 may become equal to or nearly equal to a voltage value of the ground terminal 52 based on the closed connection of the first capacitor 74. As such, the inverter 76 may receive an input signal (e.g., the ground voltage) having a low logic value in response to the voltage spike via the second node 78. The inverter 76 may generate the output signal with the high logic value in response to receiving the input signal having the low logic value. The inverter 76 may provide the output signal with the high logic value to the gate of the second N-type switch 64.

The second N-type switch 64 may partially and/or fully close (e.g., turn on) based on the gate of the second N-type switch 64 receiving the output signal with the high logic value. Moreover, as mentioned above, the first N-type switch 62 may partially and/or fully close (e.g., turn on) in response to the voltage spike. As such, the first switching circuit 58 may close and/or provide the conductive path 70 between the power supply rail 50 and the ground terminal 52 in response to the voltage spike.

As discussed above, the RC time constant of the first resistor 72 and the first capacitor 74 and the first N-type switch 62 may reduce a leakage current of the second N-type switch 64 when the power supply rail 50 is receiving the DC signal. In some cases, coupling the first trigger circuit 56 to the sources of the first N-type switch 62 and the drain of the second N-type switch 64 in lieu of the power supply rail 50 may also reduce the voltage difference between the drain and the gate of the second N-type switch 64 when receiving the DC signal. As such, in some cases, coupling the first trigger circuit 56 to the first switching circuit 58 may also reduce a leakage current of the second N-type switch 64 when the power supply rail 50 is receiving the DC signal (e.g., when no voltage spike is present on the power supply rail 50).

Figure 8:
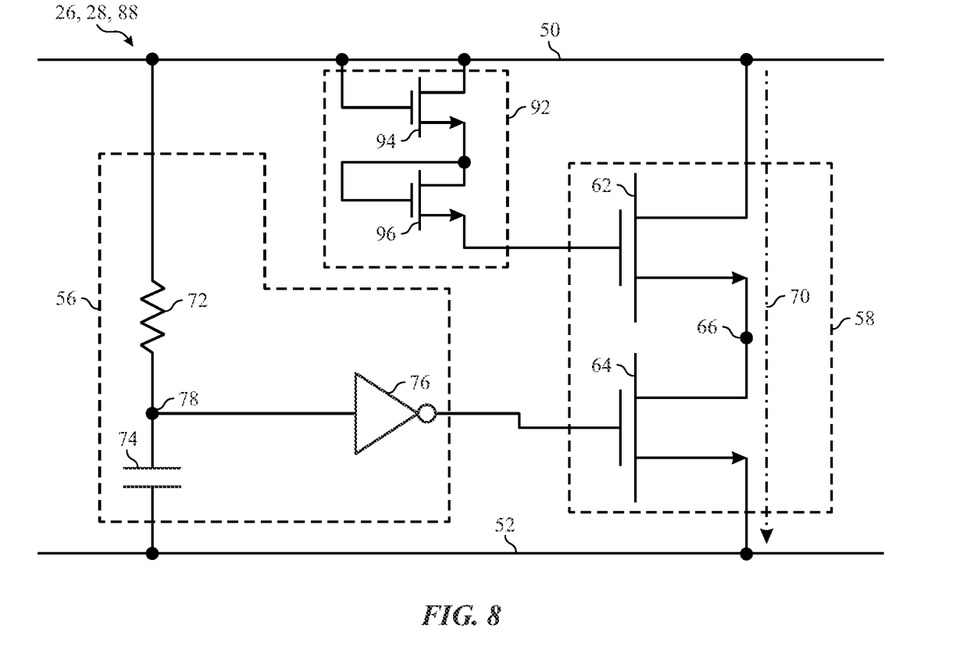
FIG. 8 is a schematic diagram of a third ESD clamp circuit including a first voltage control circuit, according to embodiments of the present disclosure.

FIG. 8 is a schematic diagram of a third ESD clamp circuit 88 including a first voltage control circuit 92, according to embodiments of the present disclosure. The third ESD clamp circuit 88 may also include the first trigger circuit 56 and the first switching circuit 58. The first trigger circuit 56 may include the first resistor 72, the first capacitor 74, and the inverter 76. Moreover, the first switching circuit 58 may include the first N-type switch 62 and the second N-type switch 64.

In the depicted embodiment, the first resistor 72 may be coupled to the power supply rail 50. It should be appreciated that in alternative or additional embodiments, the first resistor 72 may be coupled to the first switching circuit 58 at the first node 66. The first capacitor 74 may be coupled to the ground terminal 52 and may be coupled to the first resistor 72 at the second node 78. The inverter 76 may be coupled to the second N-type switch 64 of the first switching circuit 58 and may be coupled to the first resistor 72 and the first capacitor 74 at the second node 78.

The drain of the first N-type switch 62 may be coupled to the power supply rail 50 and the second N-type switch 64 may be coupled to the first N-type switch 62 at the first node 66 and may be coupled to the ground terminal 52. Moreover, a gate of the second N-type switch 64 may be coupled to an output of the inverter 76. In some cases, the first switching circuit 58 may provide the conductive path 70 between the power supply rail 50 and the ground terminal 52. Moreover, the first N-type switch 62, the second N-type switch 64, or both may open to remove the conductive path 70.

The first voltage control circuit 92 may include a third N-type switch 94 (e.g., a third switch) and a fourth N-type switch 96 (e.g., a fourth switch). In the depicted embodiment, a drain of the first N-type switch 62 may be coupled to the power supply rail 50. Moreover, a drain and a gate of the third N-type switch 94 may be coupled to the power supply rail 50. A drain of the fourth N-type switch 96 may be coupled to a source of the third N-type switch 94. A source of the third N-type switch 94 may be coupled to a gate of the first N-type switch 62.

It should be appreciated that in alternative or additional embodiments, the first voltage control circuit 92 may include additional N-type switches (e.g., a fifth switch, a sixth switch, and so on), for example, coupled between the third N-type switch 94 and the fourth N-type switch 96. In some cases, a gate and a drain of such additional switches may couple to another switch being directly or indirectly coupled to the power supply rail 50. Moreover, a source of such additional switches may couple to a drain of another switch being directly or indirectly coupled to the gate of the first N-type switch 62. It should also be appreciated that the third N-type switch 94 and the fourth N-type switch 96 may each include any viable electrical switching component such as Negative, Positive, Negative (NPN) transistors and/or N-type metal-oxide-semiconductor field-effect transistors (MOSFETs).

In some cases, the power supply rail 50 may receive the ground voltage. As such, the gate and the drain of the third N-type switch 94 may receive the ground voltage. The third N-type switch 94 and the fourth N-type switch 96 may open (e.g., remain open, become open) to remove a gate voltage of the first N-type switch 62 in response to the ground voltage. As such, the first N-type switch 62 may open (e.g., remain open, become open). Accordingly, the first switching circuit 58 may open and/or remove the conductive path 70 between the power supply rail 50 and the ground terminal 52 in response to the ground voltage.

In alternative or additional cases, the power supply rail 50 may receive the DC signal. In the depicted embodiment, the gate and the drain of the third N-type switch 94 may receive the DC signal. As such, the third N-type switch 94 and the fourth N-type switch 96 may close (e.g., remain close, become close) and output a gate voltage to the first N-type switch 62. Accordingly, the first N-type switch 62 may at least partially close to conduct the DC signal (e.g., at least a portion of the DC signal). In the depicted embodiment, the first resistor 72 of the first trigger circuit 56 may receive the DC signal via the power supply rail 50. In alternative or additional embodiments, the first resistor 72 may receive at least a portion of the DC signal via the first node 66 of the first switching circuit 58. In any case, the first capacitor 74 and the inverter 76 may receive the DC signal (e.g., the at least a portion of the DC signal) via the second node 78.

As mentioned above, a current flow through the first capacitor 74 may be proportional to a rate of voltage change across the first capacitor 74 over a time period (e.g., 1 nanosecond (ns), 10 ns, 30 ns, 500 ns, and so on). As such, the first capacitor 74 may provide an open connection (e.g., nearly open, relatively open) in response to the DC signal.

Accordingly, a voltage value of the second node 78 may become equal to, nearly equal to, and/or correspond to a voltage value of the DC signal on the power supply rail 50.

As discussed above, the voltage value of the DC signal on the power supply rail 50 may correspond to a high logic value of the inverter 76. As such, the inverter 76 may receive an input signal (e.g., the DC signal, a portion of the DC signal) having a high logic value via the second node 78. The inverter 76 may generate an output signal having a low logic value in response to receiving the input signal.

Moreover, the inverter 76 may provide the output signal having the low logic value to the gate of the second N-type switch 64. As such, the second N-type switch 64 may open (e.g., remain open, become open). Moreover, the first switching circuit 58 may open and/or remove the conductive path 70 between the power supply rail 50 and the ground terminal 52 in response to opening the second N-type switch 64. Accordingly, the third ESD clamp circuit 88 may remove the conductive path 70 when the power supply rail 50 of the electronic device 10 receives the ground voltage and/or the DC signal.

The third ESD clamp circuit 88 may provide the conductive path 70 when the power supply rail 50 and/or the ground terminal 52 of the electronic device 10 receive a voltage spike. It should be appreciated that the third ESD clamp circuit 88 may receive the voltage spike when receiving the DC signal and/or the ground voltage. In the depicted embodiment, the third N-type switch 94 and the fourth N-type switch 96 may partially and/or fully close (e.g., turn on) based on the gate and the drain of the third N-type switch 94 receiving the voltage spike. As such, the gate and the drain of the first N-type switch 62 may receive the voltage spike. The first N-type switch 62 may partially and/or fully close (e.g., turn on) in response to the voltage spike.

Moreover, the first trigger circuit 56 may receive the voltage spike. As discussed above, the first capacitor 74 may provide a closed connection (e.g., nearly closed, relatively closed) in response to the voltage spike. Moreover, the voltage value of the second node 78 may become equal to or nearly equal to a voltage value of the ground terminal 52 based on the closed connection of the first capacitor 74. As such, the inverter 76 may receive an input signal (e.g., the ground voltage) having a low logic value in response to the voltage spike via the second node 78. The inverter 76 may generate the output signal with the high logic value in response to receiving the input signal having the low logic value. The inverter 76 may provide the output signal with the high logic value to the gate of the second N-type switch 64.

The second N-type switch 64 may partially and/or fully close (e.g., turn on) based on the gate of the second N-type switch 64 receiving the output signal with the high logic value. Moreover, as mentioned above, the first N-type switch 62 may partially and/or fully close (e.g., turn on) in response to the voltage spike. As such, the first switching circuit 58 may close and/or provide the conductive path 70 between the power supply rail 50 and the ground terminal 52 in response to the voltage spike.

As discussed above, the RC time constant of the first resistor 72 and the first capacitor 74 and the first N-type switch 62 may reduce a leakage current of the second N-type switch 64 when the power supply rail 50 is receiving the DC signal. The third N-type switch 94 and the fourth N-type switch 96 may also reduce the voltage difference between the drain and the gate of the second N-type switch 64 when receiving the DC signal. As such, in some cases, the third N-type switch 94 and the fourth N-type switch 96 may also reduce a leakage current of the second N-type switch 64 when the power supply rail 50 is receiving the DC signal. Accordingly, the third ESD clamp circuit 88 may reduce the leakage current of the first switching circuit 58 when no voltage spike is present on the power supply rail 50.

Figure 9:
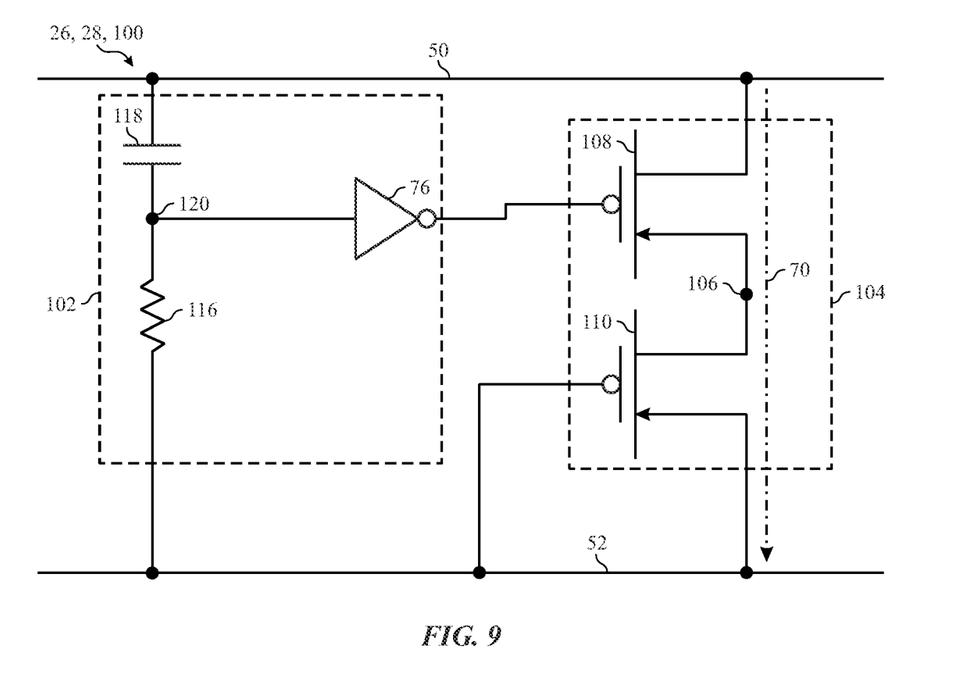
FIG. 9 is a block diagram of a second electrostatic discharge (ESD) clamp circuit including P-type switches, according to embodiments of the present disclosure.

FIG. 9 is a schematic diagram of a fourth ESD clamp circuit 100, according to embodiments of the present disclosure. The fourth ESD clamp circuit 100 may include a second trigger circuit 102 and a second switching circuit 104. In the depicted embodiment, the second switching circuit 104 may include a first P-type switch 108 (e.g., a first switch) coupled to a second P-type switch 110 (e.g., a second switch) at a third node 106.

In the depicted embodiment, a drain of the first P-type switch 108 may be coupled to the power supply rail 50. A drain of the second P-type switch 110 may be coupled to a source of the first P-type switch 108 at the third node 106. A gate and a source of the second P-type switch 110 may be coupled to the ground terminal 52. In some cases, the second switching circuit 104 may provide the conductive path 70 between the power supply rail 50 and the ground terminal 52. In particular, the first P-type switch 108 and the second P-type switch 110 may at least partially close to provide the conductive path 70, as will be appreciated. Moreover, the first P-type switch 108, the second P-type switch 110, or both may open to remove the conductive path 70.

In alternative or additional embodiments, the second switching circuit 104 may include additional P-type switches (e.g., a third switch, a fourth switch, and so on) to provide the conductive path 70. For example, the additional P-type switches may be coupled between the first P-type switch 108 and the second P-type switch 110. In some cases, a gate and a drain of such additional switches may couple to another switch being directly or indirectly coupled to the power supply rail 50. Moreover, a source of such additional switches may couple to another switch being directly or indirectly coupled to the ground terminal 52. It should also be appreciated that the first P-type switch 108 and the second P-type switch 110 may each include any viable electrical switching component such as Negative, Positive, Negative (NPN) transistors and/or N-type metal-oxide-semiconductor field-effect transistors (MOSFETs).

The second trigger circuit 102 may include a second resistor 116, a second capacitor 118, and the inverter 76. In the depicted embodiment, the second resistor 116 may be coupled to the ground terminal 52. The second capacitor 118 may be coupled to the power supply rail 50 and may be coupled to the second resistor 116 at a fourth node 120. An input of the inverter 76 may be coupled to the second resistor 116 and the second capacitor 118 at the fourth node 120. Moreover, an output of the inverter 76 may be coupled to a gate of the first P-type switch 108 of the second switching circuit 104.

In some cases, the power supply rail 50 may receive the ground voltage. In alternative or additional cases, the power supply rail 50 may receive the DC signal. The second trigger circuit 102 may receive the DC signal and/or the ground voltage. A current flow through the second capacitor 118 may be proportional to a rate of voltage change across the second capacitor 118 over a time period (e.g., 1 nanosecond (ns), 10 ns, 30 ns, 500 ns, and so on). Moreover, the DC signal and/or the ground voltage may have a constant voltage, near constant voltage, and/or a voltage change rate (e.g., frequency) below a capacitor voltage change threshold of the second capacitor 118 over the time period. As such, the second capacitor 118 may provide an open connection (e.g., nearly open, relatively open) in response to the DC signal and/or the ground voltage. Accordingly, a voltage value of the fourth node 120 may become equal to, nearly equal to, and/or correspond to a voltage value of the ground voltage on the ground terminal 52.

The voltage value of the ground voltage on the ground terminal 52 may correspond to a high logic value of the inverter 76. For example, the ground voltage may have a voltage value lower than a high logic value threshold of the inverter 76. As such, the inverter 76 may receive an input signal having a low logic value via the fourth node 120. The inverter 76 may generate an output signal having a high logic value in response to receiving the input signal.

The inverter 76 may provide the output signal having the high logic value to the gate of the first P-type switch 108. As such, the first P-type switch 108 may open (e.g., remain open, become open). Moreover, the second switching circuit 104 may open and/or remove the conductive path 70 between the power supply rail 50 and the ground terminal 52 in response to opening the first P-type switch 108. Accordingly, the fourth ESD clamp circuit 100 may remove the conductive path 70 when the power supply rail 50 of the electronic device 10 receives the ground voltage and/or the DC signal.

The second P-type switch 110 may reduce a voltage difference between the drain of the first P-type switch 108 when receiving the DC signal. For example, if not compensated for, the first P-type switch 108 may conduct a portion of the electrical currents of the DC signal to the ground terminal 52 when no voltage spikes are present on the power supply rail 50. As such, in some cases, the second P-type switch 110 may reduce a leakage current of the first P-type switch 108 when the power supply rail 50 is receiving the DC signal. Accordingly, the fourth ESD clamp circuit 100 may reduce the leakage current of the second switching circuit 104 when no voltage spike is present on the power supply rail 50.

With the foregoing in mind, the fourth ESD clamp circuit 100 may provide the conductive path 70 when the power supply rail 50 and/or the ground terminal 52 of the electronic device 10 receives a voltage spike, as will be appreciated. In some cases, the voltage spike may be characterized by a voltage change rate (e.g., a voltage rise and/or fall over a time period) higher than a voltage change rate threshold. For example, the voltage change rate threshold may correspond to 1 volt (V) per 1 nanosecond (ns), 100 V per 1 ns, 1 V per 10 ns, or 5 V per 20 ns, among other possibilities. It should be appreciated that the fourth ESD clamp circuit 100 may receive the voltage spike when receiving the DC signal and/or the ground voltage.

In the depicted embodiment, the drain of the first P-type switch 108 may receive the voltage spike (e.g., one or more voltage spikes). Moreover, the second trigger circuit 102 may receive the voltage spike. As mentioned above, the current flow through the second capacitor 118 may be proportional to a rate of voltage change across the second capacitor 118. Moreover, the voltage spike may be characterized by a voltage change rate higher than the voltage change rate threshold. Accordingly, the second capacitor 118 may provide a closed connection (e.g., nearly closed, relatively closed) in response to the voltage spike. Moreover, a voltage value of the fourth node 120 may become equal to or nearly equal to a voltage value of the power supply rail 50 based on the closed connection of the second capacitor 118.

A voltage value of the power supply rail 50 may correspond to a high logic value of the inverter 76. As such, the inverter 76 may receive an input signal (e.g., at least a portion of the DC signal, a voltage value of the voltage spike) having a high logic value in response to the voltage spike via the fourth node 120. The inverter 76 may generate an output signal with a low logic value in response to receiving the input signal having the high logic value. The inverter 76 may provide the output signal with the low logic value to the gate of the first P-type switch 108.

The first P-type switch 108 may partially and/or fully close (e.g., turn on) based on the gate of the first P-type switch 108 receiving the output signal with the low logic value. Moreover, the second P-type switch 110 may partially and/or fully close (e.g., turn on) in response to the gate and the source of the second P-type switch 110 receiving the ground voltage of the ground terminal 52. As such, the second switching circuit 104 may close and/or provide the conductive path 70 between the power supply rail 50 and the ground terminal 52 in response to the voltage spike.

The first P-type switch 108 and the second P-type switch 110 may conduct at least a portion of the electrical currents of the voltage spike to the ground terminal 52 via the conductive path 70. Accordingly, the fourth ESD clamp circuit 100 may ground at least a portion of the electrical currents of the voltage spike to reduce one or more adverse effects of the voltage spike. For example, if not compensated for, the voltage spike may have adverse effects on electrical components, stored data, transient data, and/or may cause overheating and/or instability of the electronic device 10.

Subsequently, the second trigger circuit 102 may provide (e.g., return to providing) the high logic value to the gate of the first P-type switch 108. For example, a resistance value of the second resistor 116 and a capacitance value of the second capacitor 118 may provide an RC time constant for charging and/or discharging the second capacitor 118 through the second resistor 116. In the depicted embodiment, the RC time constant may correspond to a time for opening and/or removing the conductive path 70 after closing the first P-type switch 108 and the second P-type switch 110.

The RC time constant may correspond to a time (e.g., less than 1 ns, less than 10 ns, less than 100 ns, less than 150 ns, and so on) for electrostatic discharge from a human body and/or another object (e.g., another electronic device) to the ground terminal 52 via the conductive path 70. In some cases, the resistance value of the second resistor 116 and/or the capacitance value of the second capacitor 118 may be adjusted to reduce interference with the operation of the electronic device 10. For example, the second trigger circuit 102 may open and/or remove the conductive path 70 before grounding a portion of (e.g., reducing a voltage of) the DC signal higher than a threshold.

Figure 10:
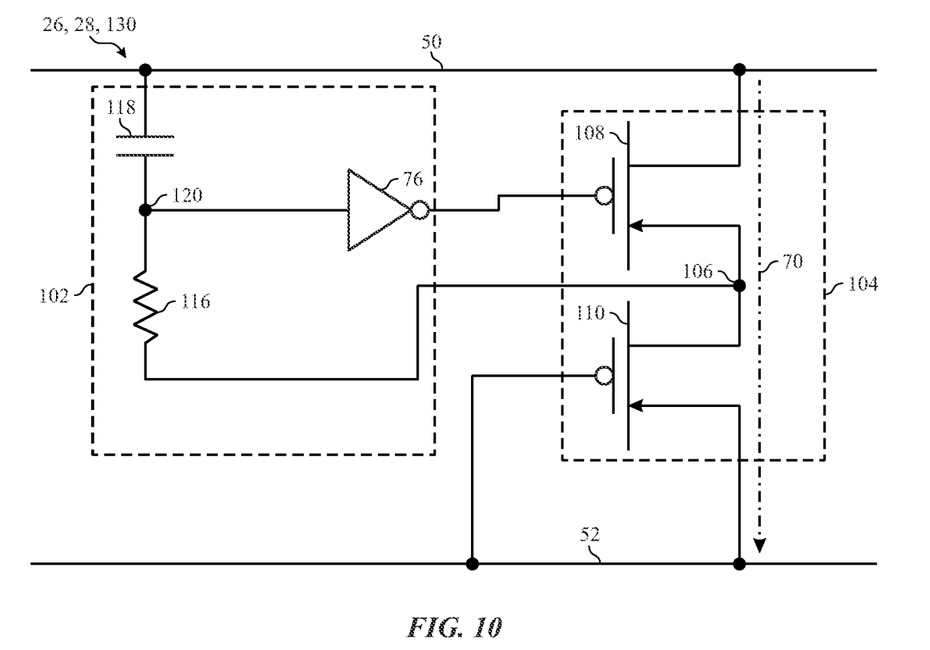
FIG. 10 is a schematic diagram of a fifth ESD clamp circuit with a second trigger circuit being coupled to a second switching circuit, according to embodiments of the present disclosure.

FIG. 10 is a schematic diagram of a fifth ESD clamp circuit 130 with the second trigger circuit 102 being coupled to the second switching circuit 104 at the third node 106, according to embodiments of the present disclosure. The fifth ESD clamp circuit 130 may include the second trigger circuit 102 including the second resistor 116, the second capacitor 118, and the inverter 76, and the second switching circuit 104 including the first P-type switch 108 coupled to the second P-type switch 110 at the third node 106.

In the depicted embodiment, the drain of the first P-type switch 108 may be coupled to the power supply rail 50. A drain of the second P-type switch 110 may be coupled to a source of the first P-type switch 108 at the third node 106. Moreover, the second trigger circuit 102 may be coupled to the source of the first P-type switch 108 and the drain of the second P-type switch 110 at the third node 106. In particular, the second resistor 116 may be coupled to the source of the first P-type switch 108 and the drain of the second P-type switch 110 at the third node 106 in lieu of being coupled to the ground terminal 52. Moreover, the gate and the source of the second P-type switch 110 may be coupled to the ground terminal 52. The first P-type switch 108 and the second P-type switch 110 may close (e.g., at least partially close) to provide the conductive path 70. Moreover, the first P-type switch 108, the second P-type switch 110, or both may open to remove the conductive path 70.

The power supply rail 50 may receive the DC signal or the ground voltage. The second capacitor 118 may receive the DC signal or the ground voltage via the fourth node 120. As discussed above, the current flow through the second capacitor 118 may be proportional to a rate of voltage change across the second capacitor 118 over a time period (e.g., 1 nanosecond (ns), 10 ns, 30 ns, 500 ns, and so on). As such, the second capacitor 118 may provide an open connection (e.g., nearly open, relatively open) in response to the DC signal and the ground voltage. A voltage value of the fourth node 120 may become equal to, nearly equal to, and/or correspond to a low voltage value of the second switching circuit 104 on the third node 106. As such, the inverter 76 may receive an input signal (e.g., the DC signal, a portion of the DC signal) having a low logic value via the fourth node 120. The inverter 76 may generate an output signal having a high logic value in response to receiving the input signal. The inverter 76 may provide the output signal having the high logic value to the gate of the first P-type switch 108.

The first P-type switch 108 may open (e.g., remain open, become open) based on the gate of the first P-type switch 108 receiving the output signal with the high logic value. As such, the second switching circuit 104 may open and/or remove the conductive path 70 between the power supply rail 50 and the ground terminal 52 in response to opening the first P-type switch 108. Accordingly, the fifth ESD clamp circuit 130 may remove the conductive path 70 when the power supply rail 50 of the electronic device 10 receives the ground voltage and/or the DC signal.

The fifth ESD clamp circuit 130 may close and/or provide the conductive path 70 when the power supply rail 50 and/or the ground terminal 52 of the electronic device 10 receive a voltage spike. It should be appreciated that the fifth ESD clamp circuit 130 may receive the voltage spike when receiving the DC signal and/or the ground voltage. The second trigger circuit 102 may receive at least a portion of the voltage spike via the third node 106 and/or through the second capacitor 118 via the power supply rail 50.

As discussed above, the second capacitor 118 may provide a closed connection (e.g., nearly closed, relatively closed) in response to the voltage spike. For example, the voltage value of the fourth node 120 may become equal to or nearly equal to a voltage value of the voltage spike based on the closed connection of the second capacitor 118. As such, the inverter 76 may receive an input signal (e.g., the ground voltage) having a high logic value in response to the voltage spike via the fourth node 120. The inverter 76 may generate the output signal with the low logic value in response to receiving the input signal having the high logic value. The inverter 76 may provide the output signal with the low logic value to the gate of the first P-type switch 108.

The first P-type switch 108 may partially and/or fully close (e.g., turn on) based on the gate of the first P-type switch 108 receiving the output signal with the high logic value. Moreover, the second P-type switch 110 may partially and/or fully close (e.g., turn on) based on the gate and the drain of the second P-type switch 110 being coupled to the ground terminal 52. As such, the second switching circuit 104 may close and/or provide the conductive path 70 between the power supply rail 50 and the ground terminal 52 in response to the voltage spike.

As discussed above, the RC time constant of the second resistor 116 and the second capacitor 118 and the second P-type switch 110 may reduce a leakage current of the first P-type switch 108 when the power supply rail 50 is receiving the DC signal. In some cases, coupling the second trigger circuit 102 to the source of the first P-type switch 108 and the drain of the second P-type switch 110 in lieu of the power supply rail 50 may also reduce the voltage difference between the drain and the gate of the second P-type switch 110 when the power supply rail 50 is receiving the DC signal. As such, in some cases, coupling the second trigger circuit 102 to the second switching circuit 104 may also reduce a leakage current of the second P-type switch 110 when the power supply rail 50 is receiving the DC signal (e.g., when no voltage spike is present on the power supply rail 50).

Figure 11:
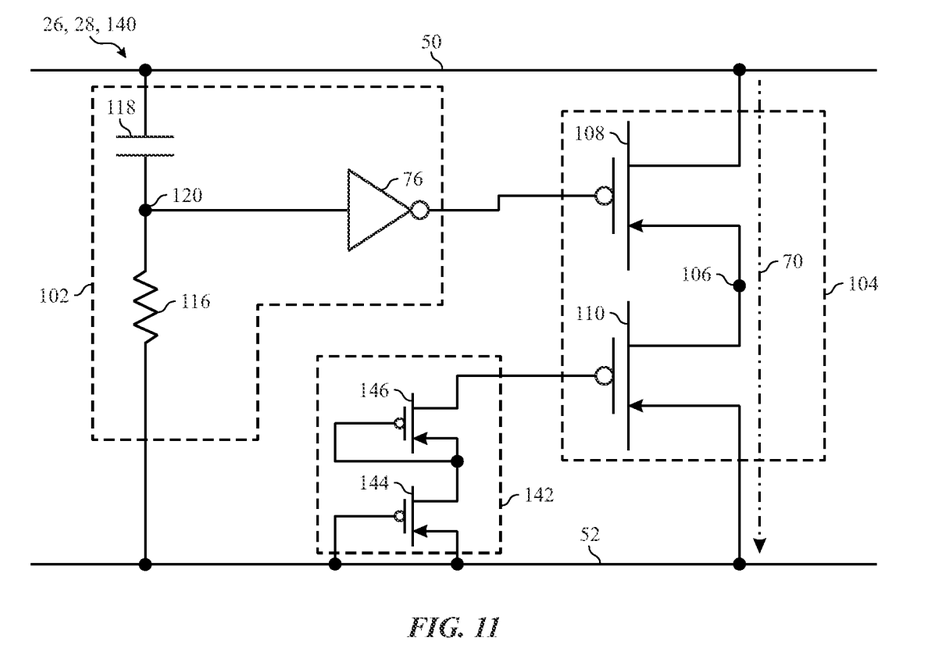
FIG. 11 is a schematic diagram of a sixth ESD clamp circuit including a second voltage control circuit, according to embodiments of the present disclosure.

FIG. 11 is a schematic diagram of a sixth ESD clamp circuit 140 including a second voltage control circuit 142, according to embodiments of the present disclosure. The sixth ESD clamp circuit 140 may also include the second trigger circuit 102 and the second switching circuit 104. The second trigger circuit 102 may include the second resistor 116, the second capacitor 118, and the inverter 76. Moreover, the second switching circuit 104 may include the first P-type switch 108 and the second P-type switch 110.

In the depicted embodiment, the second resistor 116 may be coupled to the ground terminal 52. It should be appreciated that in alternative or additional embodiments, the second resistor 116 may be coupled to the second switching circuit 104 at the third node 106. The second capacitor 118 may be coupled to the power supply rail 50 and may be coupled to the second resistor 116 at the fourth node 120. The inverter 76 may be coupled to the first P-type switch 108 of the second switching circuit 104 and may be coupled to the second resistor 116 and the second capacitor 118 at the fourth node 120.

The drain of the first P-type switch 108 may be coupled to the power supply rail 50 and the second P-type switch 110 may be coupled to the first P-type switch 108 at the third node 106 and may be coupled to the ground terminal 52. Moreover, a gate of the first P-type switch 108 may be coupled to an output of the inverter 76. In some cases, the second switching circuit 104 may provide the conductive path 70 between the power supply rail 50 and the ground terminal 52. Moreover, the first P-type switch 108, the second P-type switch 110, or both may open to remove the conductive path 70.

The second voltage control circuit 142 may include a third P-type switch 144 (e.g., a third switch) and a fourth P-type switch 146 (e.g., a fourth switch). In the depicted embodiment, a source of the second P-type switch 110 may be coupled to the ground terminal 52. Moreover, a drain and a source of the third P-type switch 144 may be coupled to the ground terminal 52. A source and a gate of the fourth P-type switch 146 may be coupled to a drain of the third P-type switch 144. A drain of the fourth P-type switch 146 may be coupled to a gate of the second P-type switch 110.

It should be appreciated that in alternative or additional embodiments, the second voltage control circuit 142 may include additional P-type switches (e.g., a fifth switch, a sixth switch, and so on), for example, coupled between the third P-type switch 144 and the fourth P-type switch 146. In some cases, a gate and a source of such additional switches may couple to another switch being directly or indirectly coupled to the ground terminal 52. Moreover, a drain of such additional switches may couple to a source of another switch being directly or indirectly coupled to the gate of the second P-type switch 110. It should also be appreciated that the third P-type switch 144 and the fourth P-type switch 146 may each include any viable electrical switching component such as Negative, Positive, Negative (NPN) transistors and/or N-type metal-oxide-semiconductor field-effect transistors (MOSFETs).

In the depicted embodiment, the third P-type switch 144 and the fourth P-type switch 146 may partially and/or fully close (e.g., turn on) based on the gate and the drain of the fourth P-type switch 146 being coupled to the ground terminal 52. As such, the second P-type switch 110 may be partially and/or fully closed (e.g., turned on). As discussed above, the third P-type switch 144 may also partially and/or fully close (e.g., turn on) based on the second trigger circuit 102 receiving a voltage spike. Accordingly, the second switching circuit 104 may provide the conductive path 70 between the power supply rail 50 and the ground terminal 52 in response to the voltage spike.

As discussed above, the RC time constant of the second resistor 116 and the second capacitor 118 and the second P-type switch 110 may reduce a leakage current of the first P-type switch 108 when the power supply rail 50 is receiving the DC signal. The third P-type switch 144 and the fourth P-type switch 146 may also reduce the voltage difference between the drain and the gate of the second P-type switch 110 when receiving the DC signal. As such, in some cases, the third P-type switch 144 and the fourth P-type switch 146 may also reduce a leakage current of the first P-type switch 108 when the power supply rail 50 is receiving the DC signal. Accordingly, the sixth ESD clamp circuit 140 may reduce the leakage current of the second switching circuit 104 when no voltage spike is present on the power supply rail 50.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electrostatic discharge clamp circuit comprising:
    a switching circuit comprising:
        a first switch, wherein a drain of the first switch is coupled to a power supply rail; and
        a second switch, wherein a drain of the second switch is coupled to a source of the first switch, and wherein a source of the second switch is coupled to a ground terminal;
    a trigger circuit comprising a resistor, a capacitor, and an inverter, wherein the resistor is directly electrically coupled to the ground terminal, the capacitor is directly electrically coupled to the resistor via a node and directly electrically coupled to the power supply rail, an input of the inverter is directly electrically coupled to the resistor and the capacitor via the node, and an output of the inverter is directly electrically coupled to a gate of the first switch; and
    a third switch, wherein a drain of the third switch is coupled to a gate of the second switch, a gate and a source of the third switch are coupled to the ground terminal, and the third switch is not coupled to the resistor, the capacitor, and the input of the inverter via the node.

2. The electrostatic discharge clamp circuit of claim 1, wherein the gate of the second switch is coupled to the ground terminal via the third switch.

3. The electrostatic discharge clamp circuit of claim 1, comprising a fourth switch, wherein a source and a gate of the fourth switch are coupled to the ground terminal, and the gate and the source of the third switch are coupled to the ground terminal via the fourth switch.

4. The electrostatic discharge clamp circuit of claim 3, wherein the second switch, the third switch, and the fourth switch are configured to close when the power supply rail or the ground terminal is receiving a bias voltage, a voltage spike having the voltage change rate higher than the threshold, or both.

5. The electrostatic discharge clamp circuit of claim 3, comprising a fifth switch, wherein a drain of the fifth switch is coupled to the source and the gate of the third switch, and a source and a gate of the fifth switch are coupled to the drain of the fourth switch.

6. The electrostatic discharge clamp circuit of claim 1, comprising an additional switch, wherein a drain of the additional switch is coupled to the source of the first switch, and wherein a source and a gate of the additional switch are coupled to the drain of the second switch.

7. The electrostatic discharge clamp circuit of claim 1, wherein the trigger circuit comprises:
    a resistor coupled to the ground terminal;
    a capacitor coupled to the resistor at a node and coupled to the power supply rail; and
    an inverter, wherein an input of the inverter is coupled to the resistor and the capacitor at the node and an output of the inverter is coupled to the gate of the first switch.

8. The electrostatic discharge clamp circuit of claim 1, wherein the trigger circuit is configured to provide an output signal having a low logic value to close the first switch in response to the voltage change rate higher than the threshold on the ground terminal or the power supply rail.

9. An electronic device comprising:
    a power supply rail;
    a ground terminal; and
    an electrostatic discharge clamp circuit coupled to the power supply rail and the ground terminal, wherein the electrostatic discharge clamp circuit comprises:
        a switching circuit comprising:
            a first switch, wherein a drain of the first switch is coupled to the power supply rail; and a second switch, wherein a drain of the second switch is coupled to a source of the first switch, and a source of the second switch is coupled to the ground terminal;

a trigger circuit comprising a resistor, a capacitor, and an inverter, wherein the resistor is directly electrically coupled to the power supply rail, the capacitor is directly coupled to the resistor via a node and directly electrically coupled to the ground terminal, an input of the inverter is directly electrically coupled to the resistor and the capacitor via the node, and an output of the inverter is directly electrically coupled to a gate of the second switch; and a third switch, wherein a source of the third switch is coupled to a gate of the first switch, and wherein a gate and a drain of the third switch are coupled to the power supply rail, and the third switch is not coupled to the resistor, the capacitor, and the input of the inverter via the node.

10. The electronic device of claim 9, comprising:
a processor core complex, wherein the power supply rail and the ground terminal are coupled to the processor core complex;
an electronic display, wherein the power supply rail and the ground terminal are coupled to the electronic display; or
both.

11. The electronic device of claim 9, wherein the trigger circuit comprises:
a resistor coupled to the power supply rail;
a capacitor coupled to the resistor at a node and coupled to the ground terminal; and
an inverter, wherein an input of the inverter is coupled to the resistor and the capacitor at the node and an output of the inverter is coupled to the gate of the second switch.

12. The electronic device of claim 9, wherein the gate of the first switch is coupled to the power supply rail via the third switch.

13. The electronic device of claim 12, comprising a fourth switch, wherein a gate and a drain of the fourth switch are coupled to the power supply rail, and wherein a source of the fourth switch is coupled to the gate and the drain of the third switch.

14. An electrostatic discharge clamp circuit comprising:
a trigger circuit comprising a resistor, a capacitor, and an inverter, wherein the resistor is directly electrically coupled a power supply rail, the capacitor is directly electrically coupled to the resistor and directly electrically coupled to a ground terminal, an input of the inverter is directly electrically coupled to the resistor and the capacitor, and an output of the inverter is directly electrically coupled to a gate of a second switch;
a first switch coupled to the power supply rail; and
the second switch coupled to the first switch, the trigger circuit, and the ground terminal,
a third switch coupled to the first switch and the power supply rail, wherein the third switch is not coupled to the resistor, the capacitor, and the input of the inverter via the node;
wherein the first switch and the second switch are configured to provide a conductive path in response to a voltage change rate higher than a threshold on the ground terminal or the power supply rail, wherein the first switch and the third switch are configured to reduce a difference between a drain voltage and a gate voltage of the second switch when the power supply rail is receiving a bias voltage and the voltage change rate is equal to or below the threshold on the ground terminal or the power supply rail.

15. The electrostatic discharge clamp circuit of claim 14, wherein a drain of the first switch is coupled to the power supply rail and a gate of the first switch is coupled to the power supply rail via the third switch.

16. The electrostatic discharge clamp circuit of claim 14, wherein a drain of the second switch is coupled to a source of the first switch, and wherein a source of the second switch is coupled to the ground terminal.

17. The electrostatic discharge clamp circuit of claim 14, wherein the first switch and the second switch are configured to provide the conductive path to ground at least a portion of electrical currents associated with a voltage spike having the voltage change rate higher than the threshold on the ground terminal or the power supply rail.

18. The electrostatic discharge clamp circuit of claim 14, wherein the trigger circuit is coupled to a gate of the second switch, wherein the trigger circuit is configured to close the second switch in response to the voltage change rate higher than the threshold.

19. The electrostatic discharge clamp circuit of claim 14, comprising a fourth switch coupled to the third switch and the power supply rail, wherein the fourth switch is configured to reduce a difference between the drain voltage and the gate voltage of the second switch when the power supply rail is receiving the bias voltage and the voltage change rate is equal to or below the threshold on the ground terminal or the power supply rail.

20. The electrostatic discharge clamp circuit of claim 14, wherein the first switch, the second switch, and the third switch each comprise a respective N-type metal oxide semiconductor switch.

* * * * *